United States Patent [19]

Rosenberg

[11] Patent Number: 4,526,607

[45] Date of Patent: Jul. 2, 1985

[54] DEWATERING OF NATURALLY MOIST CRUDE PEAT

[75] Inventor: Burkard Rosenberg, Horw, Switzerland

[73] Assignee: Bell Maschinenfabrik Aktiengesellschaft, Kriens, Switzerland

[21] Appl. No.: 543,986

[22] Filed: Oct. 20, 1983

[30] Foreign Application Priority Data

Nov. 3, 1982 [CH] Switzerland ........................ 6386/82

[51] Int. Cl.³ .............................................. C05F 11/02

[52] U.S. Cl. .......................................... 71/24; 44/32; 210/783

[58] Field of Search ...................................... 44/27-32; 210/783, 386; 71/24; 37/3

[56] References Cited

U.S. PATENT DOCUMENTS

| | | | |
|---|---|---|---|
| 1,487,764 | 3/1924 | Stillman | 44/27 |
| 2,019,824 | 11/1935 | Liehr et al. | 71/24 |
| 3,603,643 | 9/1971 | Hirota et al. | 44/30 X |
| 4,185,987 | 1/1980 | Tilkanen | 71/24 |
| 4,417,982 | 11/1983 | Britschgi et al. | 210/386 |
| 4,447,334 | 5/1984 | Britschgi et al. | 210/783 |

FOREIGN PATENT DOCUMENTS 2097297 11/1982 United Kingdom .

*Primary Examiner*—Ferris H. Lander

*Attorney, Agent, or Firm*—Robert A. Ostmann

[57] ABSTRACT

The invention relates to the dewatering of naturally moist crude peat. In the method disclosed, dewatering is accomplished in stages. In the first stage, the peat is passed through a press (A) to produce an intermediate product which is passed to a filter press system (B) where the peat is further dewatered in at least two successive filter press chambers (11,13). In passage between the press chambers the peat is loosened and in the last dewatering stage (13) the peat is compacted. The resultant product can be handleable and transportable with minimal risk. In addition to being largely independent of weather and temperature, the method is considerably more economical than previous processes which were inefficient in terms of time and/or energy consumption.

9 Claims, 1 Drawing Figure

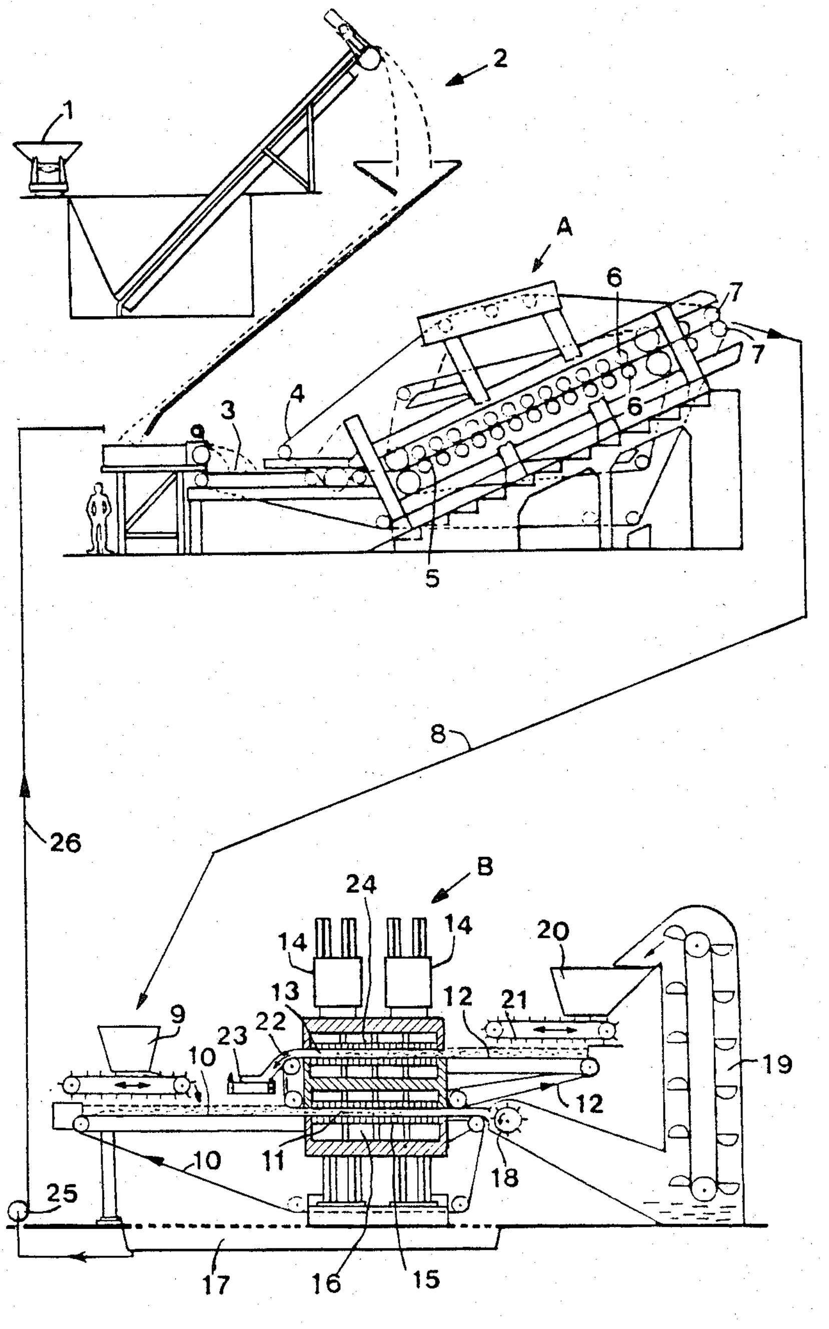
1
2
A
3
4
5
6
6
7
7
8
9
26
B
24
14
14
20
13
12
21
22
23
10
12
19
11
10
18
25
17
16
15

DEWATERING OF NATURALLY MOIST CRUDE PEAT

BACKGROUND TO THE INVENTION

The invention relates to the dewatering of naturally moist crude peat. Particularly, it relates to a method which can reduce the water content of crude peat to a level at which the peat is relatively easily combustible, in a single continuous process.

Dewatered peat may be used, for example, for heating purposes. For this application, a naturally moist crude peat from a peat bog with a water content of the order of 90% and over must be dewatered, and to be combustible without auxiliary heating, normally to a level of 45% to 55% water by weight depending on its quality; i.e., depending on the respective calorific value of its dry substance.

In one original method, peat was dewatered by piling the peat into mounds, and then into a so-called stacks which are left to dry in the open air, for an unforseeable length of time. Such a method was totally dependent upon the weather, and the amount of drying time required could not be foreseen. In a more modern method, the peat is given a preliminary dewatering mechanically by means of a press to a residual moisture content of 60% to 70% by weight and is then dried in the air if necessary. This method, also, is largely dependent on the weather and, like the previously mentioned method, takes up large storage areas and unforeseeably long drying times.

For industrial heating, whenever peat must be continually available as a fuel in large quantities, a proportion of another fuel with an higher calorific value can be added to a mechanically dewatered peat to form a self-combustible mixture, or a peat which has been given a preliminary dewatering is loaded onto a heating layer of a fuel of higher calorific value for combustion. As such fuels, coal, oil or gas can be used.

Peat which has been given a preliminary dewatering can also be dried thermally, for example in a fluidized bed drier, into a self-combustible product. The self-combustible peat obtained in this way is normally subsequently burned in a furnace, and a portion of the heat thus obtained may be drawn back off to heat the drier. In this process, approximately 50% of the available calorific value of the peat is lost on evaporation of the water in the drier.

The methods mentioned above are not very economical, because on evaporation of the high proportion of water of the peat which is to be burned in this way, a large proportion of its calorific value is lost, usually at least 800 Kcal for 1 liter of water evaporated.

A peat having a residual moistness of 45%-55% water can also be produced through so-called blending, in which a more moist peat, containing for example 60%-70% water—, is mixed with a drier peat; e.g., containing about 20% water obtained from other sources of supply. A desired average moistness of, for example, 45%-55% can be obtained in this way.

A further disadvantage of known dewatering techniques is that the dewatered peat is a loose, light, spongy bulk material, the transportation and storage of which not only take up large volumes, but is also extremely difficult. Further, it is expensive and dangerous because of the fire risk and the possibility of explosion. In addition, the peat continues to dry naturally; the fibres become brittle and fragile; and breaking of the fibres results in a powdery peat of poorer quality because of the damaged structure if it is used, for example, to improve cultivated ground. For these purposes, fibrous peat is required which, so far as possible, maintains its original, natural structure.

It is intended to use peat in large quantities for the reconstitution of areas which have been transformed into steppe or arid areas; e.g., on various such technical agricultural programmes in developing countries. An obstacle to all this is the hitherto unsolved question of economical and safe transportation of large quantities of peat over large distances.

It is indeed known to pack the peat—by whatever way it has been dewatered—in bales in plastic bags for transportation, which facilitates handling and restricts further drying out. This method is however costly, such that it is only justifiable today in the field of the relatively small requirement for horticulture. In terms of volume, it only entails small advantages in transportation, so that transportation over long distances, even by sea, would be very or too expensive.

SUMMARY OF THE INVENTION

According to the present invention a method of dewatering naturally moist crude peat comprises passing the crude moist peat through a first dewatering press to produce an intermediate product with a reduced water content; and further dewatering the peat in stages in a filter press system having at least two successive filter press chambers, the respective filter cake being loosened in passage between the filter press chambers, and compacted in the final dewatering stage. In the final stage, the peat can be compacted to peat fibre briquettes or slabs. Slabs may be cut or prepared into pieces which can be readily packaged or palletted.

The method of the invention can be operated to produce dewatered peat continuously and, if required, in large quantities. The produce may be in a compacted, cohesive form, which in terms of volume represents a fraction of the natural volume of the peat, and in this way the original structure of the fibres of the peat can be substantially retained. To a large extent they are undamaged, which means they can remain essentially unbroken.

A typical naturally moist crude peat contains over 90% water by weight and in a method according to the invention is dewatered in the first dewatering press to an intermediate product having 60% to 80%, preferably 60% to 70% water by weight. In the subsequent pressing phases the water content can be reduced to 45% to 55% by weight.

Apparatus for carrying out the method of the invention can use, in the first dewatering phase, a double machine wire press with a plurality of pairs of pressing rolls arranged along the dewatering strip of the press, and in the subsequent filter press system at least two filter press chambers arranged above each other, commanded according to the same working cycle. Using such apparatus, 1 liter of water can be withdrawn from the peat with an energy expenditure of approximately 50 Kcal. The dewatering method of the invention is therefore substantially more economical than the dewatering processes previously known, and referred to above.

In the method of the invention, the natural structure of the peat fibres need not be destroyed. The pressing can be controlled such that it takes place only within the framework of the elasticity available in each case, in relation to the moistness of the fibres. Even during the final dewatering stage their elasticity is such that compacting can take place without breaking of the fibres. The last pressing stage, as the dewatering is completed, can be controlled such that the point is reached, as regards the moistness of the fibres, where their elasticity is lost and therefore the form obtained is substantially stable.

The product obtained can be stacked and further stored, and can continue to dry out naturally, without the threat of fire or explosion through spontaneous ignition. It can be expediently prepared for transportation; e.g., loaded on transportation pallets. Its volume is a fraction of the originally natural volume of the raw peat.

In order to be used for agricultural applications discussed above, after being transported over a long distance, the dewatered product may be rewatered or moistened back again with water, whereby the original high elasticity, caused by a degree of moistness, is reproduced in the undamaged fibres. The reconstituted peat is then in a condition, for example, to be worked into the earth to improve the ground.

BRIEF DESCRIPTION OF THE DRAWING

The invention will now be described, by way of example, and with reference to the accompanying drawing which shows schematically an installation in which the method may be carried out. Further advantages and benefits of the invention will be apparent from the following description thereof.

DESCRIPTION OF THE PREFERRED EMBODIMENT

A naturally moist crude peat having a water content of say 90% by weight, extracted from a peat bog, is delivered from tipping cart 1 via a conveyor device 2, to a first dewatering phase. This takes place by means of a continuously operating dewatering press A. In the installation illustrated, it is a double machine wire press with a lower machine wire 3 and an upper machine wire 4, between which a dewatering strip 5 is formed, which is arranged along a plurality of pairs of pressing rolls 6,6. This double machine wire press is an apparatus known per se, in which the crude peat is dewatered under gradually increasing pressure, between the successive pairs of pressing rolls, so that an intermediate product, which is obtained after the final pair of pressing rolls 7,7, has a proportion of water of 60% to 70% by weight. With the apparatus proposed in the installation shown, an intermediate product with this proportion of water can be readily expected. A double machine wire press such as this is described, for example, in British patent specification No: 2 097 277A (application No: 82 12180).

The intermediate product is transferred via a transportation path 8 into a subsequent pressing phase. In this subsequent pressing phase, the product is further dewatered to the desired residual moistness of 45% to 55% by weight. This dewatering takes place in batches and stages in at least two successive filter press chambers, whereby the respective filter cake is loosened and shifted on the path from the one filter press chamber to the next.

In the installation shown, to carry out the subsequent pressing phase, a filter press system B is used, which operates as follows:

The intermediate product arrives from the transportation path 8 into a first sprinkling device 9, through which it is sprinkled and piled onto a first machine wire 10. The machine wire 10 leads through a first filter press chamber 11, through which also a second machine wire 12 is carried, so that the layer of peat to be pressed, which is approximately 100 mm high, lies between the two machine wires and is able to be moved with them in and out to the filter press chamber 11. The second machine wire 12 leads on through a second filter press chamber 13, which is arranged above the first. From there, the machine wire 12 leads back to the first filter press chamber 11. The two filter press chambers 11 and 13 arranged one above the other, are of the same dimensions, and the pressure plates forming and defining them, such as for example the pressure plate designated by 15, are commanded in the same working rhythm; i.e., they are moved in the same working rhythm by means of hydraulically operated motors 14. Thus the relative closing and opening of the two filter press chambers 11 and 13 takes place in the same working rhythm and direction. This means that they are both closed at one and the same interval of time, or are opened simultaneously at another interval of time. The two machine wires 10 and 12 are also moved in the same working rhythm as the filter press chambers: in the interval of time when the two filter press chambers 11 and 13 are opened, the two machine wires 10 and 12 are moved in the direction indicated by the arrows in the drawing. Thus a pressed filter cake is removed in each case from the filter press chamber and a next batch of peat which is to be pressed is carried into the filter press chamber. This takes place with regard to the first filter press chamber 11 in the drawing from left to right and with regard to the second pressing chamber 13 in the drawing from right to left. This movement takes place in the working rhythm in each case by one step, the length of which is equal to the length of the filter press chamber. This applies to the two machine wires and the two filter press chambers, because these have the same dimensions. After this step, the machine wires 10 and 12 remain still and the filter press chambers are closed for pressing. In the following working stroke the filter press chambers are opened and the machine wires are moved on by the length of a step.

The filter press chambers do not need to be confined laterally. The layer of peat which is approximately 100 mm high, is fixed on the machine wires; i.e., within the layer the particles only move in the direction of the pressing force, not transversely thereto. The peat fibres are thereby not damaged.

A filtrate resulting during pressing penetrates through the machine wires and through perforated pressing plates confining the filter press chambers; e.g., one of the pressing plates is designated by 15 and the perforation is indicated by vertical lines,—into collecting chambers which are provided, one of which, for example is designated by 16, and is carried away from there into a filtrate tank 17. The filtrate contains fine particles of peat. Advantageously, the filtrate tank 17 is sunken beneath the filter press B, and is covered with a grid base, so that if the occasion arises, filtrate which is sprayed for example into the surrounding area, and—should the occasion arise—pulverized fine particles of peat, can reach it.

The filter cake moving out of the first filter press chamber 11 on the way to the following, second filter press chamber 13, is loosened and shifted as follows:

The filter cake moving out is taken up, divided and scattered by a scattering reel 18 arranged at the opening of the first filter press chamber 11, and is passed to an elevator 19. The latter transports the material into a second scattering device 20, provided above the plane of the second pressing chamber 13 arranged over the first pressing chamber 11. Through this scattering device the material, which has been loosened and shifted, is scattered and piled onto the second machine wire 12, which leads from here through the second pressing chamber 13. A suitable uniform layer, similar to the case of the first scattering device 9, is obtained here through a pushing back and forth of a scattering belt 21 of the scattering device 20. This movement takes place parallel to the machine wire and is indicated in the drawing by the direction arrows drawn in the scattering belt 21.

The very important loosening and shifting of the filter cake after the first pressing and before the next, which actually cause the desired dewatering effect in the next filter press chamber, therefore occur at the scattering reel 18, in the transportation by the elevator 19 and in the further shifting by means of the second scattering device 20 with the scattering belt 21. The devices used for this must be selected carefully, because in this phase of the process, also, the peat fibres must remain undamaged.

In the next working stroke the material which is piled on the machine wire 12 is carried by this into the second filter press chamber 13 and is pressed for a second time and at the same time is dewatered and compacted. In the following working stroke the pressing chamber 13 is opened and the product 22 which is dewatered to the desired water content of 45% to 55% by weight and compacted to a permanent shape, leaves the installation via a conveyor belt 23.

The uppermost pressing plate 24 of the cycle filter press B is provided with a briquetting form, not shown in the drawing for simplicity's sake, so that at the same time as the pressing the product is briquetted in the second, and here final, pressing chamber 13 and leaves the installation as peat briquettes. It would be possible, should the occasion arise, to add to the material prior to this pressing a suitable binding agent for assisting the briquetting, via the scattering device 20.

If desired, the product could also be prepared into another product form, suitable for transportation. It would be possible, for example, to provide between the second pressing chamber 13 and the conveyor belt 23 a cutting or breaking device, the purpose of which would be to prepare the emerging product cake in the form of a peat fibre plate or slab, which may itself be packagable, or cuttable into easily transportable or palletable pieces; e.g., in the form of broad strips.

As noted above, the filtrate occurring in the subsequent pressing phase is collected in a filtrate tank 17. Together with fine pieces of peat contained therein, it is carried from filtrate tank 17 via a pump 25 and a duct 26 to the start of the first dewatering phase A and there it is mixed together with the fresh crude peat, coming via path 2, which is to be dewatered, and is thus recirculated into the process. Any peat dust which may accumulate after the last pressing stage may also be recycled to the start of the process, and mixed with the fresh natural peat to be dewatered. Thus, these proportions of the substance subjected to the process are not lost.

If the two successive steps described here, which are carried out during the subsequent pressing phase in the two filter press chambers 11 and 13 are not sufficient to achieve the desired degree of dewatering, which could be the case with certain types of peat, it would be possible to arrange further filter press chambers for further pressing steps, between which in each case the loosening and shifting according to the invention would take place. In addition, it would be possible, for example, to connect at the outlet side a second cycle filter press to the cycle filter press described herein, with two filter press chambers arranged one over the other. Between the two presses, however, a corresponding loosening and shifting device would have to be provided.

An important advantage of the process according to the invention lies in that the dewatering both in the first dewatering phase A, and also—and principally—in the subsequent dewatering phase B, is largely independent of temperature. The temperature of the peat or of the material which is to be dewatered, insofar as it obviously lies above the freezing point of the material, has practically no effect on the result of dewatering. In contrast to other known dewatering methods or dewatering devices, we have found that an otherwise conventional heating of the material to obtain a higher degree of dewatering is unecessary, and wasted energy without leading to any better results.

As noted above, the use of binding agents can promote the compacting of the product in the final stage to a permanent shape. The selection of a suitable binding agent is also governed by the purpose to which the product is to be used. For subsequent combustion, for example any synthetic resin material could be used, which would not normally be suitable if the product is intended for technical agricultural purposes. Here, for example, certain water-soluable fertilizers would be used, whether of organic or inorganic origin.

It is possible also in the method of the invention to provide the surface of the compressed product, in whatever form, subsequently with a protective layer, which for example would inhibit a formation of dust on the surface, or would hold dust on the surface.

I claim:

1. A method of dewatering naturally moist crude peat comprising passing the crude moist peat through a first dewatering press to produce an intermediate product with a reduced water content; and further dewatering the peat in stages in a filter press system having at least two successive filter press chambers, the respective filter cake being loosened in passage between the filter press chambers, and compacted in the final dewatering stage.

2. A method according to claim 1 wherein the peat is compacted to peat fibre briquettes in the final dewatering stage.

3. A method according to claim 1 wherein the peat is compacted to peat fibre slabs in the final dewatering stage.

4. A method according to claim 3 including the step of cutting the peat fibre slabs into transportable pieces.

5. A method according to any preceding claim wherein the crude peat has an input water content of 90% by weight, the intermediate product a water content of 60% to 80% by weight, and the dewatered peat a water content of 45% to 55% by weight.

6. A method according to claim 1 wherein the dewatering press is a double machine wire press comprising a plurality of pairs of pressing rolls arranged along the dewatering strip of the press, and wherein the at least two filter press chambers of the filter press system are arranged one over the other, and operated synchronously.

7. A method according to claim 1 wherein the filtrate from the filter press system is returned to the first dewatering press and mixed with the fresh raw peat which is to be dewatered.

8. A method according to claim 1 including the step of adding a binding agent to the peat in passage to the final filter press chamber.

9. A method according to claim 8 wherein the binding agent is a fertilizer dissolved in water.

* * * * *